US00RE48713E

(19) United States
(12) Reissued Patent
Choi

(10) Patent Number: US RE48,713 E
(45) Date of Reissued Patent: Aug. 31, 2021

(54) APPARATUS AND METHOD FOR PROVIDING MAP DATA AND SYSTEM THEREOF

(71) Applicant: THINKWARE CORPORATION, Seongnam-si (KR)

(72) Inventor: Won Kyung Choi, Seongnam-si (KR)

(73) Assignee: THINKWARE CORPORATION, Seongnam-si (KR)

(21) Appl. No.: 16/123,836

(22) Filed: Sep. 6, 2018

Related U.S. Patent Documents

Reissue of:
(64) Patent No.: 9,436,703
Issued: Sep. 6, 2016
Appl. No.: 14/502,217
Filed: Sep. 30, 2014

(30) Foreign Application Priority Data

Oct. 16, 2013 (KR) ..... 10-2013-0123353

(51) Int. Cl.
*G01C 21/00* (2006.01)
*G06F 16/29* (2019.01)
(Continued)

(52) U.S. Cl.
CPC ..... *G01C 21/3885* (2020.08); *G01C 21/20* (2013.01); *G01C 21/32* (2013.01);
(Continued)

(58) Field of Classification Search
CPC .... G01C 21/3885; G01C 21/36; G01C 21/34; G01C 21/32; G01C 21/3852; G01C 21/20; G06F 16/29
See application file for complete search history.

(56) References Cited

U.S. PATENT DOCUMENTS 5,802,492 A * 9/1998 DeLorme ..... G01C 21/3476 340/990
6,178,377 B1 * 1/2001 Ishihara ..... G01C 21/30 340/995.12
(Continued)

FOREIGN PATENT DOCUMENTS

JP 2000-091935 * 3/2000
JP 2000-091935 A 3/2000
(Continued)

OTHER PUBLICATIONS

Office Action dated Nov. 3, 2014 in Korean Application No. 10-2013-0123353.
(Continued)

*Primary Examiner* — Catherine M Tarae
(74) *Attorney, Agent, or Firm* — Hayes Soloway PC

(57) ABSTRACT

A system and a method are provided that are capable of providing map data for supporting a variety of user network environments and selecting data zones freely. A navigation terminal includes a reception unit adapted to receive a file in which map data of a specific zone is stored, from a map provision server; and an execution unit adapted to execute a navigation function on the specific zone using the file. The file is produced by an individual unit with respect to each of geographic areas divided by a mesh unit having a variable size. The size of the mesh unit is decided according to the amount of information included in the geographic area such that the file has an equalized size.

15 Claims, 8 Drawing Sheets

(51) Int. Cl.

| | |
|---|---|
| ***G01C 21/36*** | (2006.01) |
| ***G01C 21/20*** | (2006.01) |
| ***G01C 21/34*** | (2006.01) |
| ***G01C 21/32*** | (2006.01) |

(52) U.S. Cl.
CPC ..... *G01C 21/34* (2013.01); *G01C 21/36* (2013.01); *G01C 21/3852* (2020.08); *G06F 16/29* (2019.01)

(56) References Cited

U.S. PATENT DOCUMENTS

| | | | | |
|---|---|---|---|---|
| 6,427,117 | B1 * | 7/2002 | Ito | G01C 21/3492 340/995.19 |
| 6,484,093 | B1 * | 11/2002 | Ito | G01C 21/34 340/990 |
| 6,532,417 | B2 * | 3/2003 | Hatano | G01C 21/26 340/988 |
| 6,574,554 | B1 * | 6/2003 | Beesley | G01C 21/30 340/990 |
| 6,721,572 | B1 * | 4/2004 | Smith | H04W 4/029 455/456.1 |
| 6,879,980 | B1 * | 4/2005 | Kothuri | G06F 17/30241 707/743 |
| 6,915,206 | B2 * | 7/2005 | Sasajima | G01C 21/32 340/990 |
| 7,243,134 | B2 * | 7/2007 | Bruner | G01C 21/34 701/25 |
| 7,260,474 | B1 * | 8/2007 | Thayathil | G01C 21/36 340/995.1 |
| 7,406,381 | B2 * | 7/2008 | Obata | G01C 21/3415 340/995.12 |
| 7,428,460 | B2 * | 9/2008 | Atarashi | G06F 16/29 701/532 |
| 7,429,825 | B2 * | 9/2008 | Kubota | B60Q 1/143 307/10.1 |
| 7,584,049 | B2 * | 9/2009 | Nomura | G01C 21/32 340/995.19 |
| 8,014,796 | B2 * | 9/2011 | Boudreau | G01C 21/32 455/457 |
| 8,150,614 | B2 * | 4/2012 | Uyama | G01C 21/32 340/995.23 |
| 8,386,163 | B2 * | 2/2013 | Severson | G01C 21/3608 701/408 |
| 8,958,984 | B2 * | 2/2015 | Okude | G01C 21/343 340/995.19 |
| 9,036,509 | B1 * | 5/2015 | Addepalli | G06F 3/167 370/259 |
| 9,267,803 | B2 * | 2/2016 | Kalai | G01C 21/3667 |
| 9,332,387 | B2 * | 5/2016 | Davis | H04W 4/021 |
| 9,683,850 | B2 * | 6/2017 | Chao | G01C 21/20 |
| 2004/0217980 | A1 * | 11/2004 | Radburn | G06F 16/51 345/672 |
| 2009/0171571 | A1 | 7/2009 | Son et al. | |
| 2010/0010738 | A1 | 1/2010 | Cho | |
| 2013/0029621 | A1 * | 1/2013 | Nakata | H04B 1/109 455/161.3 |
| 2015/0156609 | A1 | 6/2015 | Davis et al. | |

FOREIGN PATENT DOCUMENTS

| | | | | |
|---|---|---|---|---|
| JP | 2002342330 | A | * | 11/2002 |
| JP | 2009-058861 | | * | 3/2009 |
| JP | 2009-058861 | A | | 3/2009 |
| JP | 2011-117740 | | * | 6/2011 |
| JP | 2011-117740 | A | | 6/2011 |
| KR | 2002-0001369 | A | | 1/2002 |
| KR | 10-0532144 | B1 | | 11/2005 |
| WO | 2012078755 | A2 | | 6/2012 |

OTHER PUBLICATIONS

Office Action dated Nov. 6, 2015 in U.S. Appl. No. 14/502,217.
Office Action dated Dec. 12, 2016 in Chinese Application No. 201410544948.3.
Office Action dated Feb. 7, 2017 in U.S. Appl. No. 15/239,301.
Notice of Allowance dated May 23, 2017 in U.S. Appl. No. 15/239,301.
Notice of Allowance dated Mar. 12, 2018 in U.S. Appl. No. 15/691,007.
Notice of Allowance dated May 11, 2016 in U.S. Appl. No. 14/502,217.

* cited by examiner

APPARATUS AND METHOD FOR PROVIDING MAP DATA AND SYSTEM THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

[This application claims the benefit under 35 U.S.C. §119 of Korean Patent Application No. 10-2013-0123353, filed Oct. 16, 2013, which is hereby incorporated by reference in its entirety.] *The present application is a reissue application of U.S. patent application Ser. No. 14/502,217, filed Sep. 30, 2014, now U.S. Pat. No. 9,436,703, which in turn claims priority under 35 U.S.C. § 119 to Korean Patent Application No. 10-2013-0123353, filed on Oct. 16, 2013, the entire content of which are hereby incorporated herein by reference in their entirety.*

BACKGROUND

The inventive concepts described herein relate to an apparatus and a method capable of providing map data through network and a system including the same.

With the development of a smart phone and a mobile device, a communication network becomes essential to use a navigation function. However, most of existing terminals may have restrictions on performing the navigation function: loading of mass map data in advance, downloading of mass map data, and real-time connection to the communication network.

Due to the above-described restrictions, a user may waste a storage capacity or a communication packet much more than when the user necessitates only a hoped-for function.

First, a conventional navigation system may produce necessary information with a plurality of separate files according to characteristics of the necessary information. For example, files corresponding to components such as road data, background data, and search data exist. If a file for a requested service does not exist, it may be impossible to provide the requested service.

A file for a requested service exists by the Nation or by the city and province. That is, the file corresponds to a navigation service area. For example, disclosed in KR Registration No. 1005321440000 is a technique for providing map data of areas, divided by the mesh, to a navigation terminal using a network.

In case of the above-described conventional navigation way, even though being a communication-type navigation system, a navigation system must download mass map data to perform a navigation function.

Second, in the latest communication-type navigation system, most map data is stored at a server portion, and minimal data on map screen display and route guidance is transmitted toward a client terminal. In this case, it is unnecessary to early download mass map data. However, if communication is cut off, the navigation system may not perform its function any longer, which is fatal at the foreign country or mountainous territory where many communication cut-off areas exist.

With the above description, the conventional navigation system may be of at least one of two disadvantages: downloading of predetermined mass map data and real-time communication.

BRIEF SUMMARY

One object of the inventive concept is directed to provide map data providing apparatus and method and a system thereof capable of performing a navigation function with a minimal capacity with respect to a user-wanted area, without downloading unnecessary mass data, while the navigation function is normally performed at a communication cut-off situation.

Another object of the inventive concept is directed to provide map data providing apparatus and method and a system thereof capable of continuously performing a navigation function using previously provided map data, i.e., minimizing influence due to a communication situation, although communication is cut off.

One aspect of embodiments of the inventive concept is directed to provide a navigation terminal comprising a reception unit adapted to receive a file in which map data of a specific zone is stored, from a map provision server; and an execution unit adapted to execute a navigation function on the specific zone using the file, wherein the file is produced by an individual unit with respect to each of geographic areas divided by a mesh unit having a variable size, and wherein the size of the mesh unit is decided according to the amount of information included in the geographic area such that the size of the file is leveled.

In exemplary embodiments, the specific zone is selected by a user, the reception unit is further adapted to receive files of areas, corresponding to the specific zone selected by the user, from among the divided geographic areas in a lump, and the files of the areas corresponding to the specific zone selected by the user are stored at an internal memory.

In exemplary embodiments, the reception unit is further adapted to additionally receive files of areas included in a moving route in a lump when the moving route gets out of the specific zone selected by the user.

In exemplary embodiments, the specific zone is automatically set on the basis of a current position, and the reception unit is further adapted to receive files of both an area, corresponding to the current position, and an area, adjacent to the current position along a translocation direction, from among the divided geographic areas in real time.

In exemplary embodiments, the specific zone is set with a searched route up to a destination, and files of areas, included in the route, from among the divided geographic areas are received in a lump.

In exemplary embodiments, files received with respect to some areas, predicted according to a reception frequency, from among the divided geographic areas are stored in an internal memory.

In exemplary embodiments, map data of areas divided in the form of tile map according to the mesh units is stored in the files in a vector way, respectively.

In exemplary embodiments, information needed for a map screen display, a route search, and a route guidance is stored in the file, and when a reception of the file is completed, the execution unit is further adapted to hold the navigation function on the specific zone using the file, regardless of communications with the map provision server.

In exemplary embodiments, files produced by the individual unit are associated with one another such that the navigation function is connected among the geographic areas divided by the mesh unit.

Another aspect of embodiments of the inventive concept is directed to provide a map provision server comprising a division unit adapted to divide a geographic area by a mesh unit having a variable size; and a generation unit adapted to generate files of individual units, based on map data of the areas divided by the mesh unit, wherein the division unit decides sizes of mesh units on the divided areas according to the amounts of information included in the divided areas such that the sizes of the files are leveled.

Still another aspect of embodiments of the inventive concept is directed to provide a navigation providing method of a navigation terminal which provides a navigation function and includes a reception unit and an execution unit, the navigation providing method comprising receiving, by the reception unit, a file in which map data of a specific zone is stored, from a map provision server; and executing, by the execution unit, a navigation function on the specific zone using the file, wherein the file is produced by an individual unit with respect to each of geographic areas divided by a mesh unit having a variable size, and wherein the size of the mesh unit is decided according to the amount of information included in the geographic area such that the file has an equalized size.

In accordance with embodiments of the inventive concept, an update is partially performed by managing data using a file database of a small divided mesh unit with respect to a geographic area, thereby reducing an update time and increasing efficiency. Also, the amounts of information on file databases are equalized by making a capacity of each file database uniform using different division units on the geographic area, thereby maximizing efficiency of on-line or off-line update. Further, it is possible to provide a user-required area more exactly by using a file database of a small divided mesh unit, and a file structure is provided which supports various network environments (on-board, semi-board, and off-board) and processes them with one data format.

BRIEF DESCRIPTION OF THE DRAWINGS

The above and other objects and features will become apparent from the following description with reference to the following figures, wherein like reference numerals refer to like parts throughout the various figures unless otherwise specified, and wherein.

DETAILED DESCRIPTION

Figure 1:
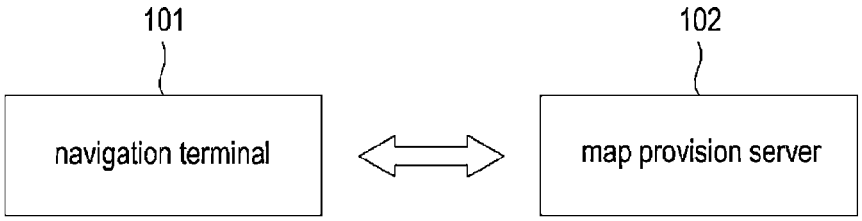
FIG. 1 is a diagram for generally describing a relation between a navigation terminal and a map provision server, according to an embodiment of the inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

In embodiments of the inventive concept, a file structure of map data is provided which supports various user network environments and makes a data area freely set.

In this specification, the term "map data" may mean all forms of maps, such as, but not limited to, 2D map, 3D map, and aerial photograph.

Embodiments of the inventive concept may be applied to a map search field associated with a global positioning system (GPS) and/or a geographical information system (GIS). In particular, embodiments of the inventive concept may be applied to a personal navigation system.

FIG. 1 is a diagram for generally describing a relation between a navigation terminal and a map provision server, in an embodiment of the inventive concept. FIG. 1 shows a navigation terminal 101 and a map provision server 102. In FIG. 1, an arrow means that data is transmitted and received between the navigation terminal 101 and the map provision server 102 through wired and wireless communications.

The navigation terminal 101 means a local device capable of searching a map. The navigation terminal 101 may mean all terminal devices capable of providing a navigation function through the mobile web or mobile App: including, but not limited to, PC, laptop computer, navigation device, smart phone, tablet, digital multimedia broadcasting (DMB), and a portable multimedia player (PMP).

The map provision server 102 is a file database system that stores and retains both geographic data indicating geographic information on a map and map data including information on various points of interest (POI) on the map. The map data may include various forms of data, such as, but not limited to, texts, images, moving pictures, and voices, for expression of the map or information. The map provision server 102 may act as the platform for providing map data to the navigation terminal 101 as a client under a PC or mobile environment.

Figure 2:
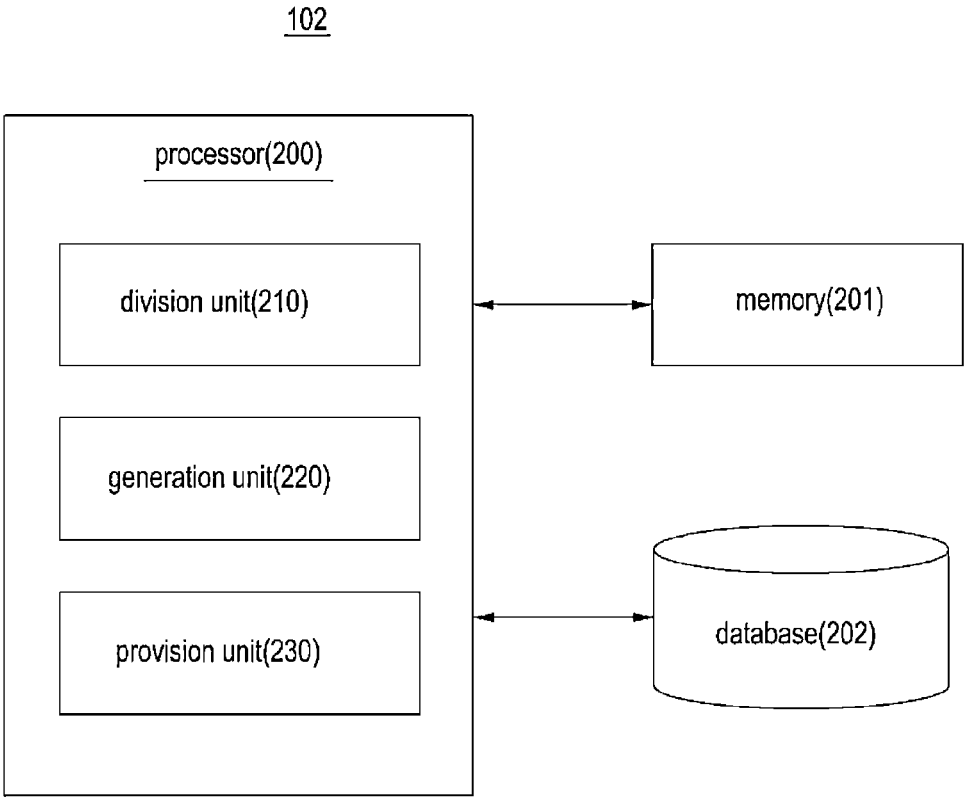
FIG. 2 is a block diagram schematically illustrating an internal configuration of a map provision server providing file database by a small divided mesh unit, according to an embodiment of the inventive concept.

FIG. 2 is a block diagram schematically illustrating an internal configuration of a map provision server providing file database by a small divided mesh unit, in an embodiment of the inventive concept.

As illustrated in FIG. 2, a map provision server 102 according to an embodiment of the inventive concept contains a processor 200, a memory 201, and a database 202. The processor 200 includes, but not limited to, a division unit 210, a generation unit 220, and a provision unit 230.

The memory 201 stores a program that includes instructions for providing all functions of providing and updating the map. For example, the program may include instructions that make it possible to provide map data of an area which a user or a navigation terminal needs. For example, the memory 201 may be, but not limited to, a hard disk drive (HDD), a solid state drive (SSD), an SD card, or another storage medium.

The database 202 acts as a file database for managing map data on the whole map. In embodiments of the inventive concept, map data of areas divided by the mesh may be stored and managed using a file database of an individual unit, respectively.

The processor 200 operates in response to instructions of the program stored in the memory 201. The processor 200 may be a microprocessor, such as a central processing unit (CPU). Below, a detailed configuration of the processor 200 will be described.

To divide and manage map data, the division unit 210 divides a geographic area on the whole map by the mesh. In exemplary embodiments, the division unit 210 applies different sizes of mesh units to areas according to the amount of data, thereby improving efficiency of data capacity and processing speed.

When the size of the mesh unit used to divide the geographic area is constant over the whole area, a difference in the amount of information between a downtown area and a mountainous area may be great, thereby causing a difference between data sizes of division areas. This may mean that communication performance and efficiency are lowered. To solve this problem, in exemplary embodiments, the size of the mesh unit may be differently decided (or, variable) according to areas such that data sizes of division areas become uniform even though mesh units have different sizes. This may be accomplished by equalizing the amounts of information of geographic areas divided by the mesh.

Figure 3:
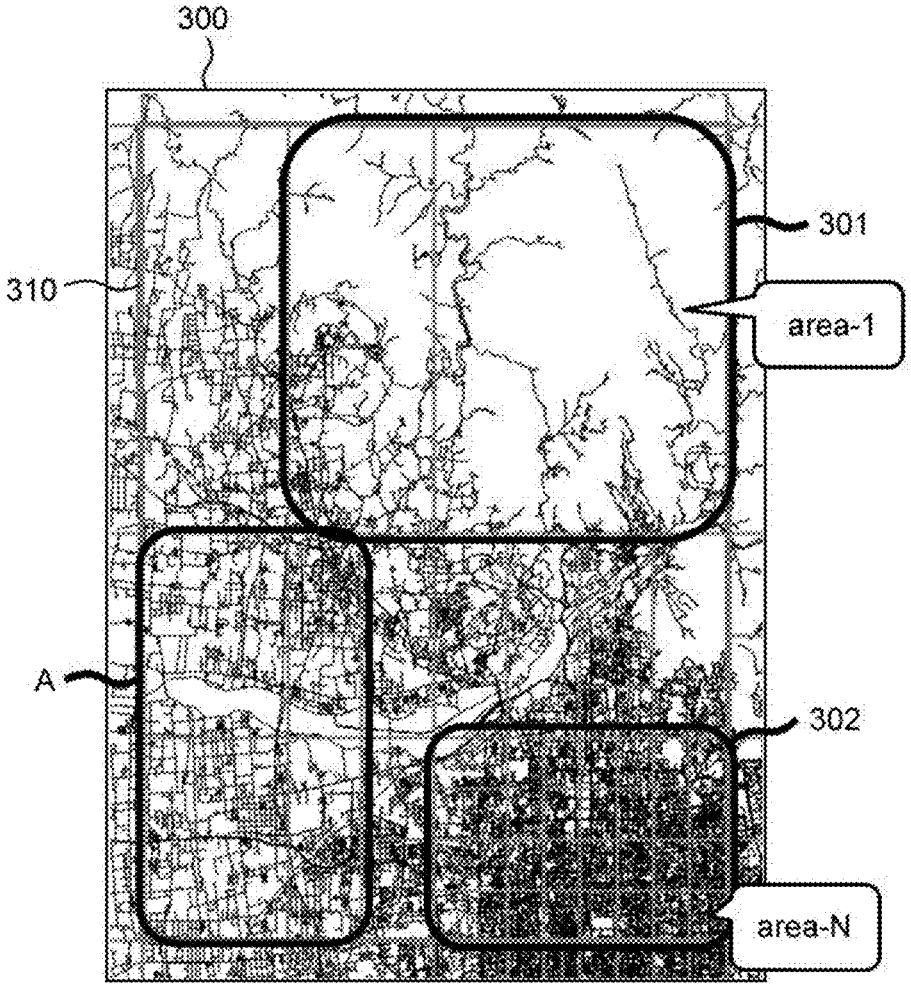
FIG. 3 is a diagram for describing a method of dividing a geographic area by mesh units with different sizes, in an embodiment of the inventive concept.

Referring to FIG. 3 which shows a diagram for describing a method of dividing a geographic area by mesh units with different sizes, in an embodiment of the inventive concept, for example, different sizes of mesh units 310 are applied to a geographic area 300 with a predetermined range. In case of dividing an area 302 (e.g., congested city area) with a large amount of information and an area 301 (e.g., mountainous area) with a relatively small amount of information, a mesh size to be applied to the area 302 with a large amount of information is decided to be greater than a mesh size to be applied to the area 301 with a relatively small amount of information. At this time, the amounts of information of areas (hereinafter, referred to as "division areas") divided by the mesh are equalized such that the division areas have the same file capacity. That is, even though one division area area-1 in the area 301 with a relatively small amount of information and one division area area-N in the area 302 with a large amount of information are divided using meshes with different sizes, the amount of information included in the division area area-1 is equal or similar to the amount of information included in the division area area-N.

For example, it is assumed that the WGS-84 (World Geodetic System) coordinate system is used. In this case, the size of the mesh unit 310 may correspond to multiplication of latitude 600 sheets and longitude 450 sheets of the mesh unit 310 if the whole earth is divided by the latitude of 0.6° and the longitude of 0.4° on the basis of a middle latitude. That is, it may correspond to an area of the earth. Moreover, the mesh unit 310 is divided into meshes of which the sizes are variable and different according to the amount of information, and a mesh with the smallest size is divided into maximally 1024 areas where 1/32 division is made with the latitude of the mesh unit 310 and with the longitude thereof, respectively. If the mesh unit 310 is referred to as an upper mesh as an upper division unit and meshes included in the upper mesh are referred to as lower meshes as a lower division unit, the upper mesh corresponding to one mesh unit 310 may be divided into a plurality of lower meshes that have different sizes according to the amount of information. If the amount of information included in one upper mesh is very small, the upper mesh may include one lower mesh.

Returning to FIG. 2, the generation unit 220 produces individual unit files (or, individual files) by storing map data of a division area in a file with respect to respective mesh units. For example, the generation unit 220 may store map data of an area, divided in the form of tile map according to the mesh unit, in a vector way. Herein, a tile may mean a unit of data that one division area includes when a geographic area is divided by the mesh.

Figure 4:
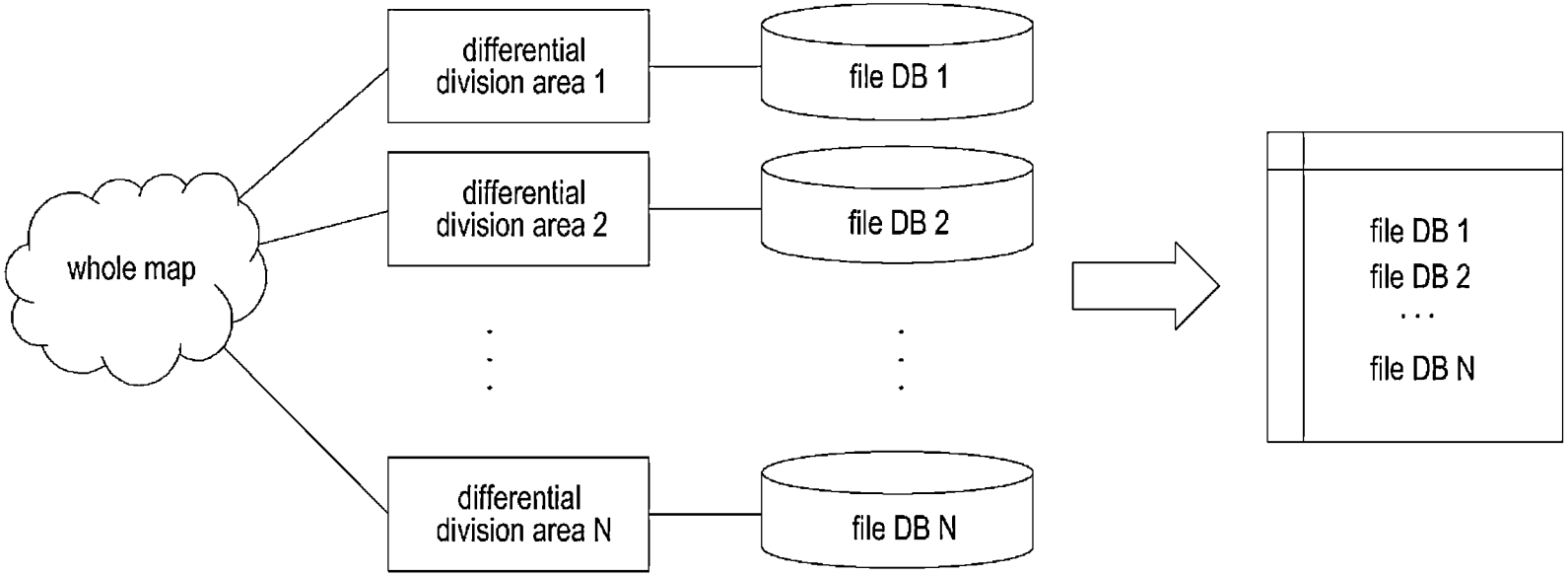
FIG. 4 is a diagram for describing a file database structure on differential division areas shown in FIG. 3, in an embodiment of the inventive concept.

Referring to FIG. 4 which shows a diagram for describing a file database structure on differential division areas shown in FIG. 3 in an embodiment of the inventive concept, a geographic area on the whole map is divided into a first differential division area 1 through an nth differential division are N. File databases (i.e., a first file database 1 through an nth file database N) are respectively produced with respect to differentially divided areas and are then stored in a database 202 as server storage.

A file database corresponding to a tile map may include an index on map data of a division area as well as position information. In exemplary embodiments, information on all components needed for map screen display (navigation DP), route search, and route guidance may be included in only one file database such that a navigation function is perfectly performed.

Moreover, one file database may further include information on connection to a file database of an adjacent area, thereby enabling a transfer between tile maps. Even though a file database of a division area is individually produced, thus, association with file databases is possible. This means that a navigation function is connected between division areas.

Returning to FIG. 2, the provision unit 230 provides a navigation terminal with file databases of areas corresponding to a specific zone according to a request of the navigation terminal. At this time, the specific zone may be set or selected by a user of the navigation terminal, may be automatically set on the basis of a current position of the navigation terminal, may be set with a searched route up to a destination, or may be set with a region that is predicted using a reception frequency at the navigation terminal.

In exemplary embodiments, a user may only download a minimal area using an individual unit file database on a small divided area, and a data zone to be downloaded (e.g., map data of 100 Km with user as the center or map data of the Seoul city) may be set more exactly and freely.

The provision unit 230, for example, provides the navigation terminal with file databases of areas, which correspond to a zone selected by a user, according to a request of the navigation terminal in a lump. Alternatively, in response to a request of the navigation terminal, the provision unit 230 searches a route up to a destination and provides the navigation terminal with file databases of areas included in the searched route in a lump. Or, based on a request of the navigation terminal, the provision unit 230 provides the navigation terminal with file databases of an area, corresponding to a current position on the basis of a current position of the navigation terminal, and an area adjacent to the current position along a translocation direction in real time.

In exemplary embodiments, a file database may include information of all components needed for route search, route guidance, and map screen display (navigation DP). Thus, it is possible to support a map data transfer, which enables consecutive execution of a navigation function, with respect to all situations regardless of on-board where a user always uses a network, semi-board where the user partially uses the network, and off-board where the use of network is impossible.

Below, a method of transferring map data will be more fully described together with constituent elements of the navigation terminal.

Figure 5:
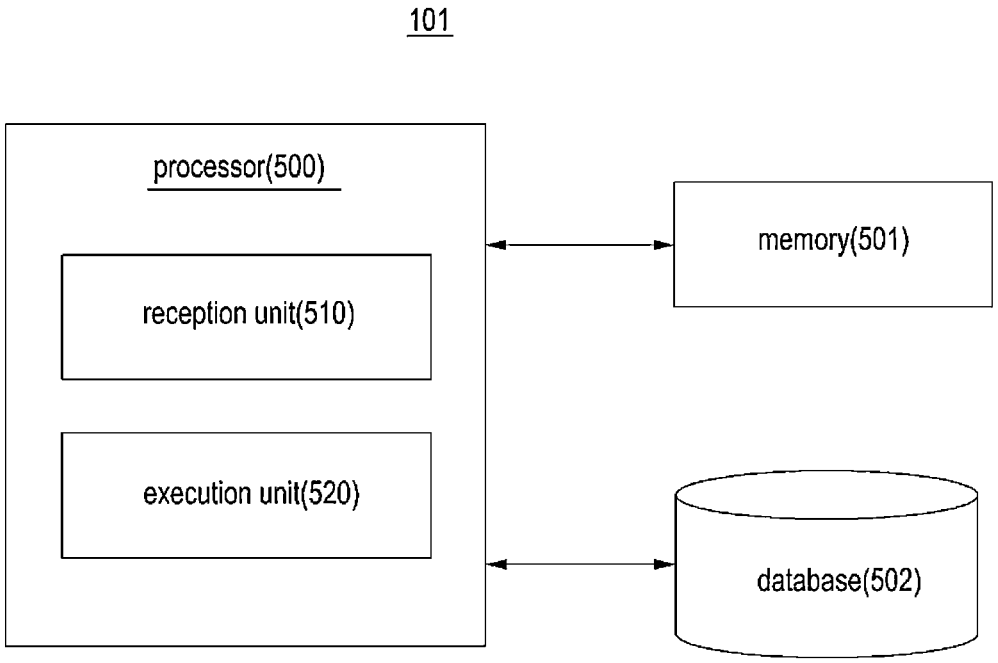
FIG. 5 is a block diagram showing an internal configuration of a navigation terminal using a file database of a small divided mesh unit, in an embodiment of the inventive concept.

FIG. 5 is a block diagram showing an internal configuration of a navigation terminal using a file database of a small divided mesh unit, in an embodiment of the inventive concept.

As illustrated in FIG. 5, a navigation terminal 101 according to an embodiment of the inventive concept contains a processor 500, a memory 501, and a database 502. The processor 500 includes the following: a reception unit 510 and an execution unit 520.

The memory 501 stores a program that includes instructions for providing a navigation function. As will be described with reference to FIG. 9, steps that the navigation terminal will perform may be executed by the program stored in the memory 501. The memory 501, for example, may include at least one of, but not limited to, a hard disk drive (HDD), a solid state drive (SSD), an SD card, and any other storage medium.

The database 502 acts as storage that stores and retains all information needed to provide all functions of a system including the navigation function. Stored in the database 502 are a file database, in which map data of each division area is stored, as well as low scale data and any other setup data that a map provision server provides to perform the navigation function.

The processor 500 is a device that operates according to instructions of the program stored in the memory 501. The processor 500 may contain a microprocessor (e.g., CPU), for example. Below, a configuration of the processor 500 will be described in detail.

The reception unit 510 receives data, needed to perform a navigation function, from the map provision server in association with the map provision server. The reception unit 510 receives a file database, in which map data of a specific zone is stored, from the map provision server. In particular, file databases are individually received with respect to division areas in the specific zone. In exemplary embodiments, now that a file database where map data is stored is individually generated every division area, it is possible to use a way where a file stream is directly accessed through position information. If a transfer of an individual file database (or, a file database of an individual unit) into a navigation terminal ends, the individual file database may be used to continuously perform a navigation function in an off-line environment regardless of whether the navigation terminal communicates with the map provision server.

For example, a user selects either a peripheral area with the specific position as the center or a specific administrative district through an interface means of the navigation terminal. The reception unit 510 receives file databases of areas, which correspond to a specific zone selected by the user, from the map provision server in a lump. Alternatively, the map provision server searches a route up to a destination according to a request of the navigation terminal, and the reception unit 510 receives file databases of areas, which are included in the route thus searched, from the map provision server in a lump. Or, the reception unit 510 receives file databases of both an area, corresponding to a current position on the basis of a current position of the navigation terminal, and an area adjacent to the current position along a translocation direction in real time.

The execution unit 520 performs a navigation function on the specific zone using a file database of an individual unit. In other words, the execution unit 520 supports the navigation function, including route search, route guidance, and map search, using information of the file database (information of components associated with an index on map data of a division area, map screen display (navigation DP), route search, and route guidance).

A user may download map data in a way suitable for a communication environment that a navigation terminal will use.

Figure 6:
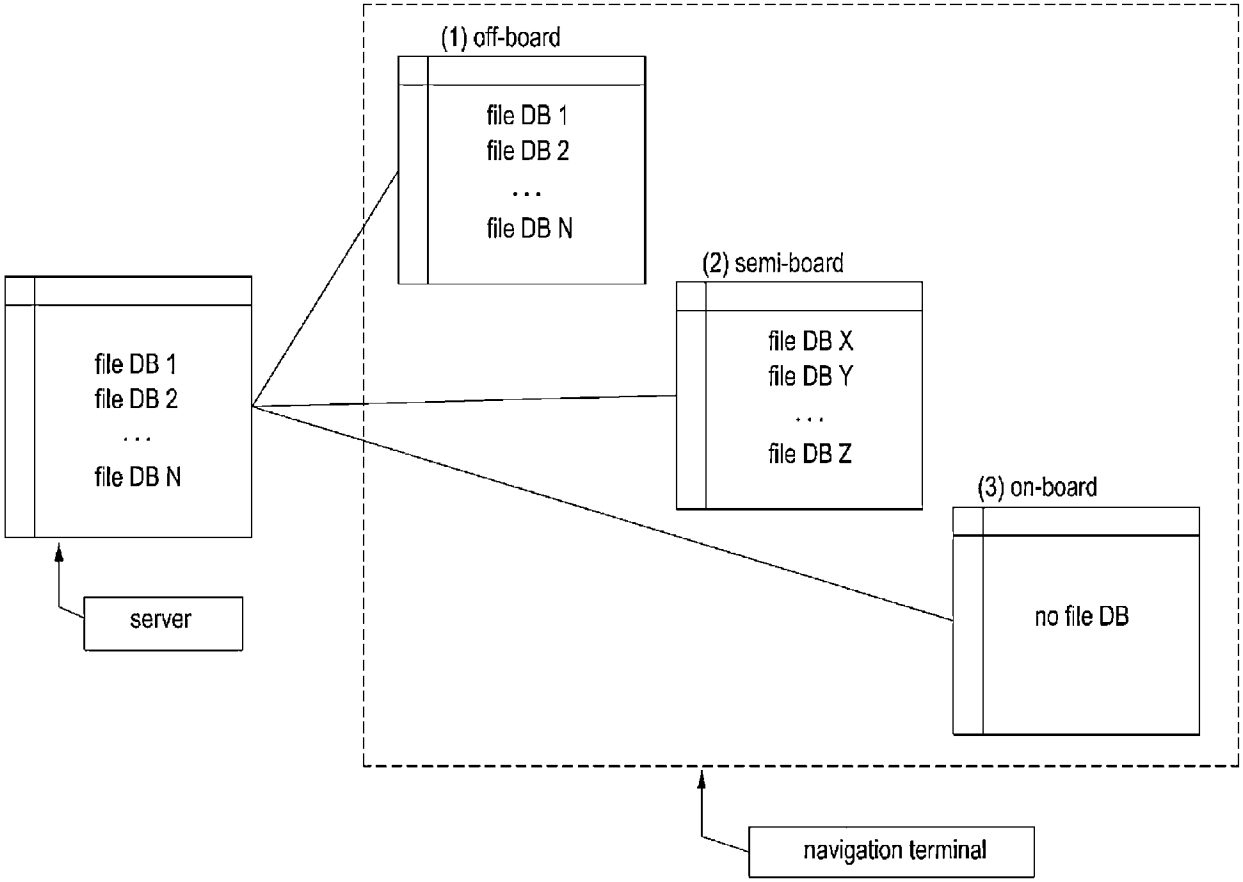
FIGS. 6 through 8 are diagrams for describing a map data transfer way according to communication environments of a navigation terminal, in an embodiment of the inventive concept.
Figure 7:
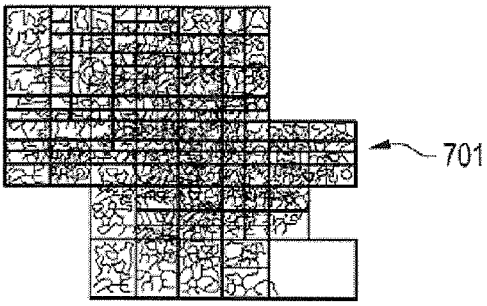
Figure 7:
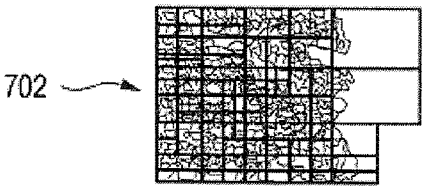
Figure 8:
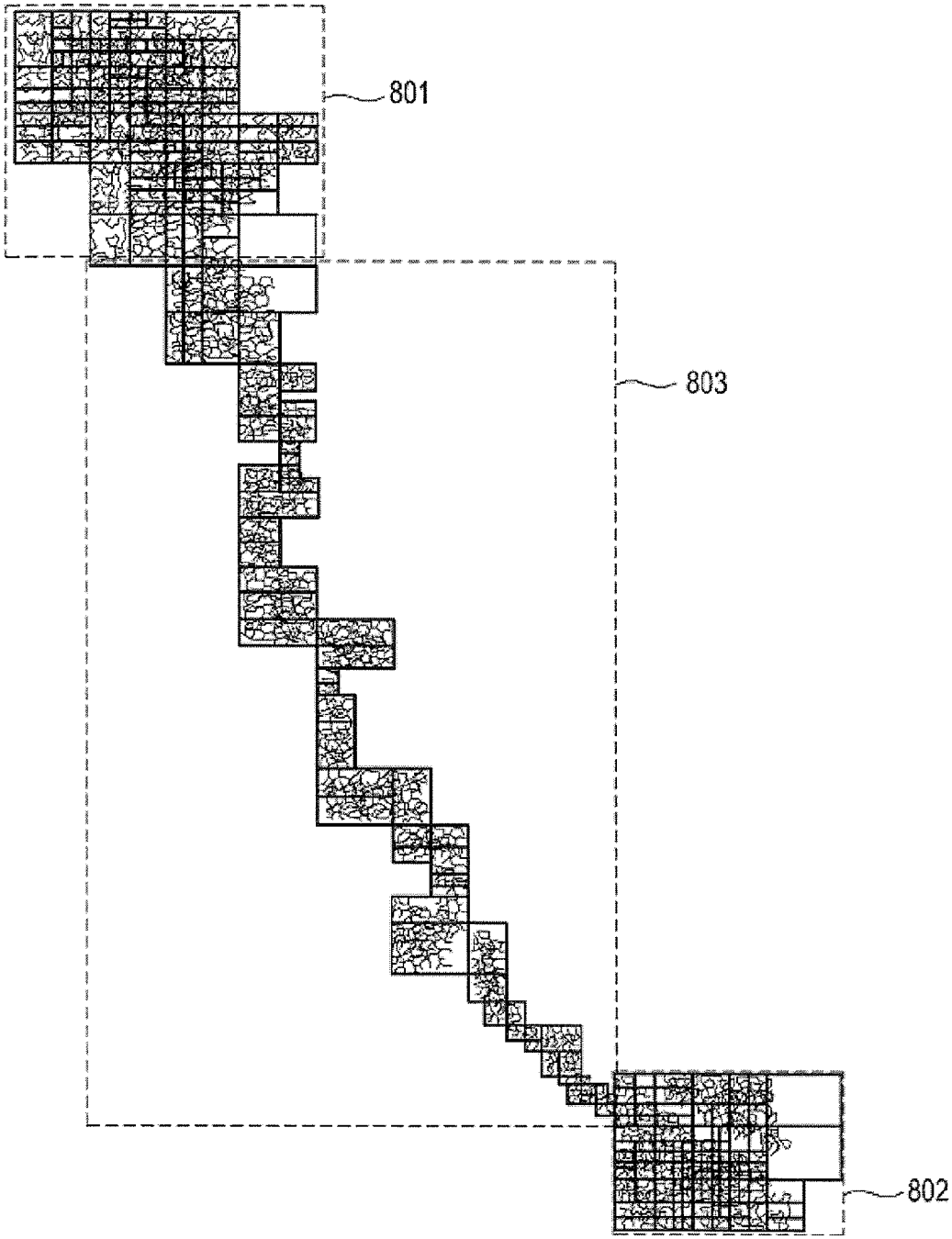

FIGS. 6 through 8 are diagrams for describing a map data transfer way according to communication environments of a navigation terminal, in an embodiment of the inventive concept.

Referring to FIG. 6, (1) in case a user does not want the use of network while a navigation function is performed (on-board), first, the reception unit 510 previously loads all file databases on the whole map including a first file database 1 through an nth file database N and stores them at a database 502 as local storage. Next, the execution unit 520 processes the file databases stored in the database 502 directly and locally such that performed is a navigation function on a geographic area of the whole map at an off-line environment.

(2) In case a user wants the use of network partially while a navigation function is performed (semi-board), first, the reception unit 510 previously loads file databases X through Z, corresponding to a zone set by the user, from among all file databases on the whole map including a first file database 1 through an nth file database N, and it stores them at the database 502.

In other words, to select a zone to be downloaded, a user enters several km radius or selects a specific administrative distinct. The map provision server selects file databases X through Z, in which map data of the zone selected by the user is stored, from among all file databases on the whole map including a first file database 1 through an nth file database N, and it provides them to a navigation terminal. For example, assuming that a geographic area 300 illustrated in FIG. 3 is the whole map, a first file database 1 through an nth file database N are file databases that are produced in a one-to-one way with respect to areas of the geographic area 300 divided with different sizes. Assuming that a zone selected by the user is a portion A of the geographic area 300, file databases X through Z are file databases on division areas included in a user-selected zone A as at least a part of a first file database 1 through an nth file database N. The number of file databases X through Z is not fixed or limited thereto. For example, the number of file databases X through Z may be decided according to a zone selected by a user.

At this time, the reception unit 510 receives the file databases X through Z on the zone set by the user from the map provision server and stores them at an internal memory of the navigation terminal, that is, the database 502. Next, the execution unit 520 processes file databases stored in the database 502 directly and locally such that performed is a navigation function on a user-selected zone at an off-line environment.

In particular, if file databases of other areas other than a previously downloaded zone is required, the reception unit 510 may receive file databases of other areas in a lump, or in real time on the basis of a current position. For example, when a moving route gets out of a previously downloaded zone, the reception unit 510 further receives file databases of areas included in the moving route in a lump. At this time, file databases of additional areas are temporarily stored in a cache, not the database 502. However, when a reception frequency is over a predetermined number, the additional areas are predicted as frequently used areas. In this case, the file databases of the additional areas may be stored at the database 502 as additional file databases.

Referring to FIG. 7, for example, it is assumed that a user previously downloads city A 701 and city Z 702 as selected zones. With this assumption, in areas in the city A 701 and the city Z 702, a file database of a corresponding area is processed directly and locally such that a navigation function is independently performed at an off-line environment. As illustrated in FIG. 8, however, when city A 801 and city Z 802 are not adjacent to each other, there is not stored a moving route, which starts from a position of the city A 801 and arrives at a specific position of the city Z 802, that is, file databases corresponding to an area 803 between the city A 801 and the city Z 802. For this reason, a network is temporarily activated such that file databases of areas included in the moving route are received through connection information between file databases in a lump. Next, at an off-line environment, a navigation function is performed with respect to the moving route from the city A 801 to the city Z 802 through the area 803.

(3) Returning to FIG. 6, when a user always uses the network while the navigation function is performed (off-board), file databases on map data are not stored in the database 502; however, low scale data and other setup data are stored therein. In this case, the reception unit 510 receives files of both an area corresponding to a current position on the basis of a current position of a navigation terminal and an area adjacent to the current position along a translocation direction in real time. At this time, the file databases received in real time are temporarily stored in a cache, not the database 502. However, when a reception frequency is over a predetermined number, the areas corresponding to the file databases received in real time are set to frequently used areas. In this case, the file databases received in real time may be stored at the database 502. The execution unit 520 performs a navigation function on a current position using the file databases received in real time. Even though communication is cut off with respect to an area corresponding to a reception-completed file database, it is possible to continuously provide all navigation functions including, but not limited to, map screen display, route search, and route guidance, at an off-line environment.

In embodiments of the inventive concept, it is possible to divide a geographic area differently according to the amount of data and level the amounts of information of division areas. Also, a user downloads map data of a wanted zone more exactly. When reception on the map data is completed, it is possible to perfectly support a navigation function at an off-line environment and provide a file structure capable of being processed according to one data format in various communication environments.

Figure 9:
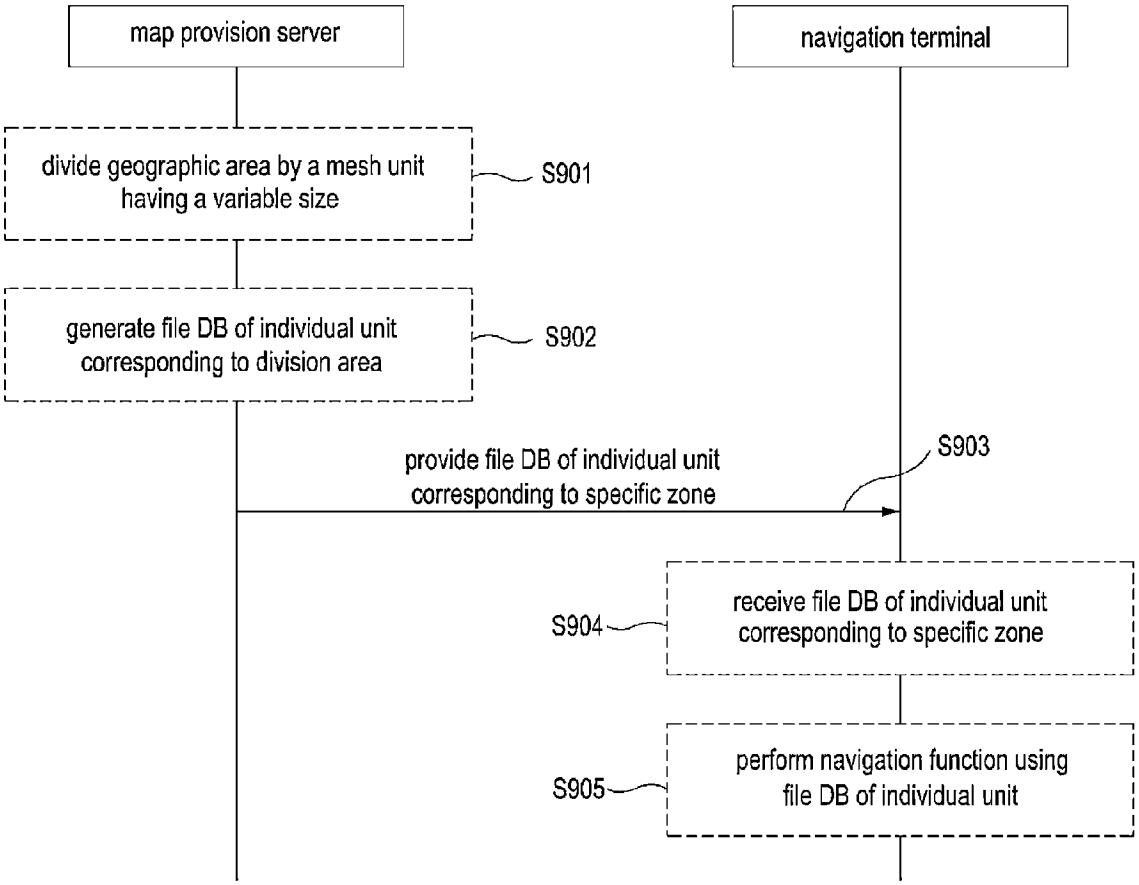
FIG. 9 is a flow chart showing a navigation providing method in which a navigation function is provided using a file database of a small divided mesh unit, according to an embodiment of the inventive concept.

FIG. 9 is a flow chart showing a navigation providing method in which a navigation function is provided using a file database of a small divided mesh unit, according to an embodiment of the inventive concept. Steps of a navigation providing method according to an embodiment of the inventive concept may be respectively executed by a map provision server and a navigation terminal described with reference to FIGS. 1 through 8.

The navigation terminal performs a navigation function based on map data that the map provision server supplies.

In step S901, a division unit of the map provision server divides a geographic area on the whole map with mesh units having different sizes. In exemplary embodiments, the sizes of mesh units for dividing map data vary with the amounts of information included in division areas such that file sizes of the division areas are leveled.

In step S902, a generation unit of the map provision server produces individual unit file databases on the mesh units, based on map data of division areas. At this time, the generation unit of the map provision server produces file databases by storing map data of areas, divided in the form of tile map according to mesh units, in a vector way. Moreover, the file databases are stored to include information on connection to a file database of an adjacent area at the generation unit of the map provision server. In this case, even though the file databases of the division areas are individually produced, it is possible to connect the file databases. Thus, a navigation function may be connected among the division areas. In exemplary embodiments, information on all components needed for map screen display (navigation DP), route search, and route guidance may be stored in a file database of an individual unit to implement a perfect navigation function only using one file database.

In step S903, a provision unit of the map provision server provides a navigation terminal with file databases of areas belonging to a specific zone according to a request of the navigation terminal. At this time, the specific zone may be set (or, selected) by a user of the navigation terminal, may be automatically set on the basis of a current position of the navigation terminal, may be set with a searched route up to a destination, or may be set with a region that is predicted using a reception frequency at the navigation terminal.

In step S904, a reception unit of the navigation terminal receives, from the map provision server, data needed to perform a navigation function in association with the map provision server. At this time, the reception unit of the navigation terminal receives file databases, in which map data of a specific zone is stored, from the map provision server. In particular, the file databases are received by an individual unit with respect to division areas in the specific zone.

For example, a user selects either a peripheral area with the specific position as the center or a specific administrative district through an interface means of the navigation terminal. The reception unit of the map provision server receives file databases of areas, which correspond to a specific zone selected by the user, from the map provision server in a lump. At this time, the file databases of the zone selected by the user may be stored at a local database of the navigation terminal, and it may be anytime used to perform a navigation function. Alternatively, the map provision server searches a route up to a destination according to a request of the navigation terminal, and a reception unit of the navigation terminal receives file databases of areas, which are included in the route thus searched, from the map provision server in a lump. File databases of areas included in a route are temporarily stored in a cache, not the local database of the navigation terminal. However, when a reception frequency is over a predetermined number, the areas included in the route are set to frequently used areas. In this case, the file databases of the areas included in the route may be stored at the database. Or, the reception unit of the navigation terminal receives file databases of both an area, corresponding to a current position on the basis of a current position of the navigation terminal, and an area adjacent to the current position along a translocation direction in real time. The file databases received in real time on the basis of the current position are temporarily stored in a cache, not the local database of the navigation terminal. However, when a reception frequency is over a predetermined number, areas corresponding to the file databases received in real time are set to frequently used areas. In this case, the file databases received in real time may be selectively stored at the database.

In step S905, an execution unit of the navigation terminal performs a navigation function on the specific zone using individual-unit file databases. The execution unit of the navigation terminal supports navigation functions, including route search, route guidance, and map search, using information of the file database (information of components associated with an index on map data of a division area, map screen display (navigation DP), route search, and route guidance). In particular, if a transfer of an individual-unit file database into a navigation terminal ends, the individual-unit file database may be used to continuously perform a navigation function at an off-line environment regardless of whether the navigation terminal communicates with the map provision server.

In the above-described navigation providing method, steps may be skipped or added on the basis of detailed contents of a navigation terminal and a map provision server described with reference to FIGS. 1 through 8. Further, two or more operations may be combined, or the order of operations or their places may be changed.

Methods according to an embodiment of the inventive concept may be implemented with program instructions executable by various computer systems and may be recorded at a computer-readable media. For example, a computer-readable media may be configured to record a program that includes steps of: receiving files, in which map data of a specific zone is stored, from a map provision server; and performing a navigation function on the specific zone using the files. At this time, the files may be produced by an individual unit with respect to geographic areas divided by mesh units having different sizes, and the sizes of the mesh units are decided according to the amounts of information included in the geographic areas such that file sizes are leveled. The files may include information needed for map screen display, route search, and route guidance.

A program according to an embodiment of the inventive concept may be implemented by a PC-based program or a dedicated application installed on a mobile terminal. In exemplary embodiments, an application for processing searched data may be implemented in the form of program that operates independently, or it may be implemented in the form of in-app of a specific application such that the application can operate on the specific application.

In accordance with an embodiment of the inventive concept, an update is partially performed by managing data using a file database of a small divided mesh unit with respect to a geographic area, thereby reducing an update time and increasing efficiency. Also, the amounts of information on file databases are equalized by making capacities of file databases uniform using different division units with respect to the geographic area, thereby maximizing efficiency of on-line or off-line update. Further, it is possible to provide a user-wanted area more exactly by using a file database of a small divided mesh unit, and a file structure is provided which supports various network environments (on-board, semi-board, and off-board) and processes them with one data format.

The units described herein may be implemented using hardware components, software components, or a combination thereof. For example, devices and components described therein may be implemented using one or more general-purpose or special purpose computers, such as, but not limited to, a processor, a controller, an arithmetic logic unit, a digital signal processor, a microcomputer, a field programmable gate array (FPGA), a programmable logic unit, a microprocessor or any other device capable of responding to and executing instructions in a defined manner. A processing device may run an operating system (OS) and one or more software applications that run on the OS. The processing device also may access, store, manipulate, process, and create data in response to execution of the software. For the sake of easy understanding, an embodiment of the inventive concept is exemplified as one processing device is used; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to perform various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

[1. A navigation terminal comprising:

a reception unit adapted to receive a file in which map data of a specific zone is stored, from a map provision server; and an execution unit adapted to execute a navigation function on the specific zone with the file, wherein the file is produced by an individual unit with respect to each of geographic areas divided by a mesh unit having a variable size, and wherein the size of the mesh unit is decided according to amount of information included in the geographic area such that the size of the file is leveled;

wherein the specific zone is selected by a user;

wherein the reception unit is further adapted to receive files of areas corresponding to the specific zone selected by the user, from the divided geographic areas in a lump; and wherein the files of the areas corresponding to the specific zone selected by the user are stored in an internal memory, and files of additional areas corresponding to zones other than the specific zone selected by the user are temporarily stored in a cache;

wherein the execution unit executes the navigation function for areas corresponding to the specific zone selected by the user upon the files stored in the internal memory, when the reception unit does not communicate with the map provision server;

wherein the execution unit executes the navigation function for the addition areas not selected by the user with the files temporarily stored in the cache, when the reception unit communicates with the map provision server; and the execution unit is configured to perform routes search, display the routes on a display device, and provide the route guidance.]

[2. The navigation terminal of claim 1, wherein the reception unit is further adapted to additionally receive files of areas included in a moving route in a lump when the moving route gets out of the specific zone selected by the user.]

[3. The navigation terminal of claim 1, wherein the specific zone is automatically set on the basis of a current position, and wherein the reception unit is further adapted to receive files of both an area, corresponding to the current position, and an area, adjacent to the current position along a translocation direction, from the divided geographic areas in real time.]

[4. The navigation terminal of claim 3, wherein files received with respect to some areas, predicted according to a reception frequency, from the divided geographic areas are stored in an internal memory.]

[5. The navigation terminal of claim 1, wherein the specific zone is set with a searched route up to a destination, and wherein files of areas, included in the route, from the divided geographic areas are received in a lump.]

[6. The navigation terminal of claim 1, wherein map data of areas divided in a form of tile map according to the mesh unit is stored in the files in a vector way, respectively.]

[7. The navigation terminal of claim 1, wherein information needed for a map screen display, a route search, and a route guidance is stored in the file, and wherein when a reception of the file is completed, the execution unit is further adapted to hold applying the navigation function on the specific zone with the file, regardless of the communications with the map provision server.]

[8. The navigation terminal of claim 1, wherein files produced by the individual unit are associated with one another such that the navigation function is connected among the geographic areas divided by the mesh unit.]

[9. A navigation providing method of a navigation terminal which provides a navigation function and includes a reception unit and an execution unit, the navigation providing method comprising:

receiving, by the reception unit, a file in which map data of a specific zone is stored, from a map provision server; and executing, by the execution unit, a navigation function on the specific zone with the file, wherein the file is produced by an individual unit with respect to each of geographic areas divided by a mesh unit having a variable size, and wherein the size of the mesh unit is decided according to amount of information included in the geographic area such that the file has an equalized size;

wherein the s specific zone is selected by a user:

wherein the reception unit is further adapted to receive files of areas corresponding to the specific zone selected by the user, from the divided geographic areas in a lump; and wherein the files of the areas corresponding to the specific zone selected by the user are stored in an internal memory, and files of additional areas corresponding to zones other than the specific zone selected by the user are temporarily stored in a cache;

the execution unit executing the navigation function for areas corresponding to the specific zone selected by the user on the files stored in the internal memory, when reception unit does not communicate with the map provision server;

the execution unit executing the navigation function for the additional areas not selected by the user with the files temporarily stored in the cache when reception unit communicates with the map provision server; and the execution unit performing routes search, displaying the routes on a display device, and proving the route guidance.]

[10. The navigation providing method of claim 9, wherein the specific zone is automatically selected on the basis of a current position, and wherein in the receiving, files of both an area, corresponding to the current position, and an area, adjacent to the current position along a translocation direction, from the divided geographic areas are received in real time.]

[11. The navigation providing method of claim 9, wherein the specific zone is set with a searched route up to a destination, and wherein in the receiving, files of areas, included in the route, from the divided geographic areas are received in a lump.]

[12. The navigation providing method of claim 9, wherein map data of each of areas divided in a form of tile map according to the mesh unit is stored in the file in a vector way.]

[13. The navigation providing method of claim 9, wherein information needed for a map screen display, a route search, and a route guidance is stored in the file, and wherein in the executing, when a reception of the file is completed, the navigation function on the specific zone is held from being applied on the file, regardless of communications with the map provision server.]

[14. The navigation providing method of claim 9, wherein files produced by the individual unit are associated with one another such that the navigation function is connected among the geographic areas divided by the mesh unit.]

[15. A non-transitory computer-readable medium which includes an instruction enabling a computer system to provide a navigation function, the computer system being controlled by a method comprising receiving a file in which map data of a specific zone is stored, from a map provision server; and executing a navigation function on the specific zone with the file, wherein the file is produced by an individual unit with respect to each of geographic areas divided by a mesh unit having a variable size, wherein the size of the mesh unit is decided according to amount of information included in the geographic area such that the file has an equalized size, and wherein information needed for a map screen display, a route search, and a route guidance is stored in the file;

wherein the specific zone is selected by a user;

wherein the computer system is further adapted to receive files of areas corresponding to the specific zones selected by the user, from the divided geographic areas in a lump; and wherein the files of the areas corresponding to the specific zone selected by the user are stored in an internal memory, and files of addition areas corresponding to zones other than the specific zone selected by the user are temporarily stored in a cache;

the computer system executing the navigation function for areas corresponding to the specific zone selected by the user on the files stored in the internal memory, when a reception unit does not communicate with the map provision server;

the computer system executing the navigation function for the additional areas not selected by the user with the files temporarily stored in the cache, when the reception unit communicates with the map provision server; and the computer system performing routes search, displaying the routes on a display device, and proving the route guidance.]

*16. A navigation data providing method of a map provision server, the navigation data providing method comprising:*

*storing entire map data for providing a navigation service;*

*connecting a user terminal through a wireless network;*

*while a connection with the wireless network is maintained, receiving, from a user terminal, a request for downloading a navigation data file among the entire map data associated with areas corresponding to a specific zone in response to a user of the user terminal selecting, by the user using a user interface of the user terminal, a range or an administrative district as the specific zone on a map displayed on the user terminal for downloading the navigation data file, wherein the request for downloading the navigation data file is separated from a request for the navigation service associated with the specific zone, and the specific zone selected by the user is associated with one or more tiled maps corresponding to the navigation data file to be downloaded to the user terminal among the entire map data; and*

*transmitting, to a storage associated with the user terminal, the navigation data file in response to the request,*

*wherein the specific zone selected by the user is bounded by border lines on the displayed map such that the specific zone selected by the user is visually distinguished from non-selected areas of the displayed map,*

*wherein the navigation data file transmitted to the storage includes data including information required to provide the user terminal with the navigation service for a route including a departure and a destination in the tiled maps included in the specific zone when the map provision server and the user terminal is not connected through the wireless network, and*

*wherein while the connection with the wireless network is maintained, the navigation data file is downloaded to the storage, and, in response that the request for navigation service is generated on the user terminal while the connection with the wireless network is not maintained, the stored navigation data file is used for providing the navigation service to the user terminal.*

*17. The navigation data providing method of claim 16, wherein the entire map data associated with the areas is divided by at least one mesh unit to produce the tile maps and stored in a database of the map provision server.*

*18. The navigation data providing method of claim 16, wherein the navigation data file includes a plurality of files, each of the plurality of files associated with at least one of the tile maps, and the transmitting comprises transmitting the files to the storage in a lump.*

*19. The navigation data providing method of claim 16, wherein the storage is a memory or a SD card included in the user terminal.*

*20. A navigation service providing method of a user terminal, the method comprising:*

*connecting a map provision server through a wireless network;*

*while a connection with the wireless network is maintained, transmitting, to the map provision server, a request for downloading a navigation data file among entire map data stored in the map provision server associated with areas corresponding to a specific zone in response to a user of the user terminal selecting, by the user using a user interface of the user terminal, a range or an administrative district as the specific zone on a map displayed on the user terminal for downloading the navigation data file, wherein the request for downloading the navigation data file is separated from a request for a navigation service associated with the specific zone, and the specific zone selected by the user is associated with one or more tiled maps corresponding to the navigation data file to be downloaded to the user terminal among the entire map data, wherein the specific zone selected by the user is bounded by border lines on the displayed map such that the specific zone selected by the user is visually distinguished from non-selected area of the displayed map;*

*receiving, from the map provision server, the navigation data file and storing the navigation data file in a storage associated with the user terminal, the navigation data file being transmitted to the storage from the map provision server in response to the request for downloading the navigation data file, wherein the navigation data file includes data including information required to provide the user terminal with a navigation service for a route including a departure and a destination in the tiled maps included in the specific zone when the map provision server and the user terminal is not connected through the wireless network;*

*receiving the request for the navigation service including a destination selected by the user after the navigation data file is stored in the storage; and*

*providing, based on a previously downloaded navigation data file including the navigation data file, the navigation service for a route including the departure without the network communication with the map provision server,*

*wherein while the connection with the wireless network is maintained, the navigation data file is downloaded to the storage, and, in response that the request for navigation service is generated on the user terminal, and*

*wherein, while the connection with the wireless network is not maintained, the stored navigation data file is used for providing the navigation service to the user terminal.*

*21. The navigation service providing method of claim 20, wherein the navigation data file includes the entire map data associated with the areas divided by at least one mesh unit to produce the tile maps.*

*22. The method of claim 20, wherein the navigation data file includes a plurality of files, each of the plurality of files associated with at least one of the tile maps, and the receiving comprises receiving the files in a lump.*

*23. The method of claim 19, wherein the storage is a memory or a SD card included in the user terminal.*

*24. A map provision server for providing a navigation data file comprises:*

*a memory; and*

*at least one processor connected to the memory, and configured to execute computer readable instructions included in the memory,*

*wherein the at least one processor is configured to:*

*store an entire map data for providing a navigation service;*

*connect a user terminal through a wireless network;*

*while a connection with the wireless network is maintained, generate a navigation data file in response to receiving, from a user terminal, a request for downloading the navigation data file among the entire map data associated with areas corresponding to a specific zone in response to a user of the user terminal selecting, by a user interface of the user terminal, a range or an administrative district as the specific zone on a map displayed on the user terminal for downloading the navigation data file, wherein the request for downloading the navigation data file is separated from a request for the navigation service associated with the specific zone, and the specific zone selected by the user is associated with one or more tiled maps corresponding to the navigation data file to be downloaded to the user terminal among the entire map data; and*

*transmit the generated navigation data file to a storage associated with the user terminal,*

*wherein the specific zone selected by the user is bounded by border lines on the displayed map such that the specific zone selected by the user is visually distinguished from non-selected area of the displayed map,*

*wherein the navigation data file transmitted to the storage includes data including information required to provide the user terminal with the navigation service for a route including a departure and a destination in the tiled maps included in the specific zone when the map*

*provision server and the user terminal is not connected through the wireless network, and*

*wherein while the connection with the wireless network is maintained, the navigation data file is downloaded to the storage, and, in response that the request for navigation service is generated on the user terminal while the connection with the wireless network is not maintained, the stored navigation data file is used for providing the navigation service to the user terminal.*

*25. The navigation data providing method of claim 16, the navigating data providing method further comprising:*

*in response that the user terminal is located out of the specific zone while the navigation service is provided to the user terminal, receiving, from the user terminal, a request for downloading additional navigation data associated with an area including a current location of the user terminal when the map provision server and the user terminal is connected through the wireless network; and*

*transmitting, to the user terminal, the additional navigation data file,*

*wherein the transmitted additional navigation data is temporarily stored in a cache associated with the user terminal when a reception frequency of the additional navigation data file for the user terminal is less than a predetermined number, and the transmitted additional navigation data is stored in the storage associated with the user terminal when the reception frequency is equal to or more than the predetermined number.*

*26. The navigation data providing method of claim 25, wherein the transmitting of the additional navigation data file comprises:*

*transmitting, to the user terminal, additional navigation data file associated with at least one area adjacent to the area including current location.*

*27. The navigation service providing method of claim 20, the navigation service providing method further comprising:*

*in response that the user terminal is located out of the specific zone while the navigation service is provided to the user terminal, transmitting, to the map provision server, a request for downloading additional navigation data associated with an area including a current location of the user terminal when the map provision server and the user terminal is connected through the wireless network; and*

*receiving, from the map provision server, the additional navigation data file,*

*wherein the received additional navigation data is temporarily stored in a cache associated with the user terminal when a reception frequency of the additional navigation data file is less than a predetermined number, and the received additional navigation data is stored in the storage associated with the user terminal when the reception frequency is equal to or more than the predetermined number.*

*28. The navigation service providing method of claim 27, wherein the receiving of the additional navigation data file comprises:*

*receiving, from the map provision server, additional navigation data file associated with at least one area adjacent to the area including current location.*

*29. The map provision server of claim 24, wherein the at least one processor is further configured to:*

*in response that the user terminal is located out of the specific zone while the navigation service is provided to the user terminal, receive, from the user terminal, a request for downloading additional navigation data associated with an area including a current location of the user terminal when the map provision server and the user terminal is connected through the wireless network; and*

*transmit, to the user terminal, the additional navigation data file,*

*wherein the transmitted additional navigation data is temporarily stored in a cache associated with the user terminal when a reception frequency of the additional navigation data file for the user terminal is less than a predetermined number, and the transmitted additional navigation data is stored in the storage associated with the user terminal when the reception frequency is equal to or more than the predetermined number.*

*30. The map provision server of claim 29, wherein the at least one processor is further configured to transmit, to the user terminal, additional navigation data file associated with at least one area adjacent to the area including current location.*

* * * * *